United States Patent
Hong

(10) Patent No.: US 11,997,542 B2
(45) Date of Patent: May 28, 2024

(54) METHOD AND DEVICE FOR MESSAGE TRANSMISSION

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 209 days.

(21) Appl. No.: 17/294,334

(22) PCT Filed: Nov. 15, 2018

(86) PCT No.: PCT/CN2018/115731
§ 371 (c)(1),
(2) Date: May 14, 2021

(87) PCT Pub. No.: WO2020/097883
PCT Pub. Date: May 22, 2020

(65) Prior Publication Data
US 2021/0410015 A1    Dec. 30, 2021

(51) Int. Cl.
*H04W 28/22* (2009.01)
*H04W 28/02* (2009.01)

(52) U.S. Cl.
CPC ....... *H04W 28/22* (2013.01); *H04W 28/0278* (2013.01)

(58) Field of Classification Search
None
See application file for complete search history.

(56) References Cited

U.S. PATENT DOCUMENTS

| 7,079,856 B2 * | 7/2006 | Khan ............... H04W 72/12 455/517 |
| 2003/0232624 A1 | 12/2003 | Toskala et al. |
| 2004/0193762 A1 | 9/2004 | Leon |
| 2005/0002366 A1 | 1/2005 | Toskala et al. |
| 2005/0220040 A1 * | 10/2005 | Petrovic ........... H04L 47/30 370/278 |

(Continued)

FOREIGN PATENT DOCUMENTS

| CN | 1663296 A | 8/2005 |
| CN | 101030926 A | 9/2007 |

(Continued)

OTHER PUBLICATIONS

International Search Report of PCT Application No. PCT/CN2018/115731 dated Aug. 14, 2019 with English translation (4p).

(Continued)

*Primary Examiner* — Kenny S Lin
(74) *Attorney, Agent, or Firm* — Arch & Lake LLP

(57) ABSTRACT

The present invention relates to a method and device for message transmission. The method comprises: when buffer overflow is found out, generating a request message, the request message carrying information related to a transmission rate; and sending the request message to a base station. The present invention solves a problem of buffer overflow by reducing the transmission rate and is particularly suitable for the buffer overflow condition caused by the unmatched transmission rate.

12 Claims, 14 Drawing Sheets

(56) References Cited

U.S. PATENT DOCUMENTS

| | | | |
|---|---|---|---|
| 2006/0174023 A1* | 8/2006 | Horn | H04L 1/0022 709/224 |
| 2006/0203760 A1* | 9/2006 | Fukui | H04L 1/1874 370/328 |
| 2007/0165575 A1* | 7/2007 | Niwano | H04W 72/1268 370/335 |
| 2009/0245223 A1* | 10/2009 | Godfrey | H04W 8/04 370/345 |
| 2009/0268616 A1* | 10/2009 | Hosomi | H04L 1/0026 370/328 |
| 2010/0246469 A1 | 9/2010 | Gheorghiu et al. | |
| 2011/0228685 A1* | 9/2011 | Higashi | H04L 47/263 370/252 |
| 2011/0317556 A1 | 12/2011 | Hiehata et al. | |
| 2012/0079132 A1* | 3/2012 | Liu | H04L 47/32 709/233 |
| 2012/0147750 A1* | 6/2012 | Pelletier | H04L 47/12 370/235 |
| 2013/0028092 A1* | 1/2013 | Tong | H04L 47/26 370/236 |
| 2013/0114497 A1* | 5/2013 | Zhang | H04W 4/06 370/312 |
| 2015/0085667 A1* | 3/2015 | Sivanesan | H04L 67/025 370/237 |
| 2016/0050653 A1 | 2/2016 | Rastogi | |
| 2016/0337072 A1* | 11/2016 | Yang | H04L 1/0035 |
| 2018/0176817 A1 | 6/2018 | Huang et al. | |

FOREIGN PATENT DOCUMENTS

| | | | | |
|---|---|---|---|---|
| CN | 101313620 | A | 11/2008 | |
| CN | 101924603 | A | 12/2010 | |
| CN | 102056242 | A | 5/2011 | |
| CN | 102474896 | A | 5/2012 | |
| CN | 102547449 | A | 7/2012 | |
| CN | 104254109 | A | 12/2014 | |
| CN | 106850595 | A | 6/2017 | |
| EP | 3629505 | A1 * | 4/2020 | H04L 1/1685 |
| WO | 2011020228 | A1 | 2/2011 | |
| WO | 2016023406 | A1 | 2/2016 | |
| WO | 2017076133 | A1 | 5/2017 | |

OTHER PUBLICATIONS

First Office Action Issued in the Chinese Application No. 201880002518.5, dated on Oct. 8, 2022, with English translation,(13p).

English translation of the Written Opinion of the International Search Authority in the international application No. PCT/CN2018/115731, mailed on Aug. 14, 2019,(3p).

Rong Wei, "Rate Control Algorithm for 3G Streaming Media Service Based on RTCP Feedback", Institute of Computer & Information Engineering, Hohai University, Changzhou 213022, China, Modern Electronics Technology, vol. 21, No. 332, 2010, May 20, 2010, with English abstract, 4 pages.

Nokia Siemens Networks, "DL Flow control over Un interface for relaying system", 3GPP TSG-RAN WG2 Meeting #68bis R2-100296 Valencia, Spain, Jan. 18-22, 2010, 2 pages.

* cited by examiner

METHOD AND DEVICE FOR MESSAGE TRANSMISSION

CROSS-REFERENCE TO RELATED APPLICATION

This application is a U.S. national stage of International Application No. PCT/CN2018/115731 filed on Nov. 15, 2018, the disclosure of which is hereby incorporated by reference in its entirety.

TECHNICAL FIELD

The present disclosure relates to the technical field of communications, and more particularly, to a method and device for transmitting a message.

BACKGROUND

Sometimes, with the development of mobile communication technologies, user equipment (UE) in 5th-generation (5G) new radio (NR) systems may obtain an ultrahigh transmission rate by configuring high-order multiple input multiple output (MIMO), multicarrier aggregation, high-order modulation coding, large broadband or the like to meet requirements of users on a high rate. However, buffer configurations and read-write rates of some 5G terminals may not support the high rate of the 5G, which may cause the problem of buffer overflows of the 5G terminal due to a fact that the buffer configuration and read-write rate of the 5G terminal are mismatched with the high rate of the 5G. This problem causes frequent data retransmissions, thereby wasting system resources and affecting service qualities.

SUMMARY

The embodiments of the present disclosure provide a method and device for transmitting a message. The technical solutions are as follows.

According to a first aspect of embodiments of the present disclosure, a method for transmitting a message is provided, which may include: generating a request message in response to finding a buffer overflow, the request message may include information relevant to a transmission rate; and sending the request message to a base station.

The technical solution provided by the embodiment of the present disclosure may achieve the following beneficial effect: the problem of buffer overflows is solved by reducing the transmission rate in the embodiment, which is particularly applied to a condition where the buffer overflow is caused by a mismatch of the transmission rate. The embodiment implements the request process of reducing the transmission rate, and provides a possibility to reduce the transmission rate.

In an embodiment, the information relevant to the transmission rate may include at least one of: reporting information on a buffer overflow caused by a mismatch of the rate, a present transmission rate value, or an expected transmission rate value reached after reduction.

The technical solution provided by the embodiment of the present disclosure may achieve the following beneficial effect: the embodiment provides multiple types of information that are relevant to the transmission rate and may be flexibly selected, and thus is applied to multiple application scenarios.

In an embodiment, the request message may include radio resource control (RRC) signaling.

The technical solution provided by the embodiment of the present disclosure may achieve the following beneficial effect: the embodiment implements the request of reducing the transmission rate through the RRC signaling, and provides a feasible solution.

In an embodiment, the method may further include: a response message sent by the base station is received; the response message may include feedback information relevant to the transmission rate, and the feedback information may include at least one of: information representing consent on reducing the transmission rate, information representing a rejection on reducing the transmission rate, an expected transmission rate value reached after reduction, or an expected configuration required to reduce to the transmission rate value; and corresponding processing is performed according to the response message.

The technical solution provided by the embodiment of the present disclosure may achieve the following beneficial effect: the embodiment implements an interactive process of requesting a reduction in the transmission rate, and thus may implement the corresponding processing.

In an embodiment, the method may further include: a timer is started in response to sending the request message to the base station; and a present transmission rate is retained when a response message sent by the base station is not received in response to the timer expiring.

The technical solution provided by the embodiment of the present disclosure may achieve the following beneficial effect: the embodiment controls a duration of the process of requesting the reduction in the transmission rate through the timer, and thus may reduce the error processing.

According to a second aspect of embodiments of the present disclosure, a method for transmitting a message is provided, which may be applied to a base station side, and may include: receiving a request message sent by UE, the request message may include information relevant to a transmission rate; and processing the request message.

In an embodiment, the information relevant to the transmission rate may include at least one of: reporting information on a buffer overflow caused by a mismatch of the rate, a present transmission rate value, or an expected transmission rate value reached after reduction.

In an embodiment, the request message may include RRC signaling.

In an embodiment, the method may further include: a response message is sent to the UE. The response message may include feedback information relevant to the transmission rate, and the feedback information may include at least one of: information representing consent on reducing the transmission rate, information representing a rejection on reducing the transmission rate, an expected transmission rate value reached after reduction, or an expected configuration required to reduce to the transmission rate value.

In an embodiment, the method may further include: a response message is rejected to be sent in response to determining that the transmission rate is rejected to be reduced.

According to a third aspect of embodiments of the present disclosure, a device for transmitting a message is provided, which may be applied to a UE side, and may include: a generation module, configured to generate a request message in response to finding a buffer overflow, and the request message may include information relevant to a transmission rate; and a sending module, configured to send the request message to a base station.

In an embodiment, the information relevant to the transmission rate may include at least one of: reporting information on a buffer overflow caused by a mismatch of the rate, a present transmission rate value, or an expected transmission rate value reached after reduction.

In an embodiment, the request message may include RRC signaling.

In an embodiment, the device may further include: a receiving module, configured to receive a response message sent by the base station; the response message may include feedback information relevant to the transmission rate, and the feedback information may include at least one of: information representing consent on reducing the transmission rate, information representing a rejection on reducing the transmission rate, an expected transmission rate value reached after reduction, or an expected configuration required to reduce to the transmission rate value; and a processing module, configured to perform corresponding processing according to the response message.

In an embodiment, the device may further include: a starting module, configured to start a timer in response to sending the request message to the base station; and a retaining module, configured to retain a present transmission rate when a response message sent by the base station is not received in response to the timer expiring.

According to a fourth aspect of embodiments of the present disclosure, a device for transmitting a message is provided, which may be applied to a base station side, and may include: a receiving module, configured to receive a request message sent by UE, and the request message may include information relevant to a transmission rate; and a processing module, configured to process the request message.

In an embodiment, the information relevant to the transmission rate may include at least one of: reporting information on a buffer overflow caused by a mismatch of the rate, a present transmission rate value, or an expected transmission rate value reached after reduction.

In an embodiment, the request message may include RRC signaling.

In an embodiment, the device may further include: a sending module, configured to send a response message to the UE. The response message may include feedback information relevant to the transmission rate, and the feedback information may include at least one of: information representing consent on reducing the transmission rate, information representing a rejection on reducing the transmission rate, an expected transmission rate value reached after reduction, or an expected configuration required to reduce to the transmission rate value.

In an embodiment, the device may further include: a rejection module, configured to reject to send a response message in response to determining that the transmission rate is rejected to be reduced.

According to a fifth aspect of embodiments of the present disclosure, a device for transmitting a message is provided, which may include: a processor; and a memory configured to store instructions executable by the processor.

The processor is configured to: generate a request message in response to finding a buffer overflow, the request message may include information relevant to a transmission rate; and send the request message to a base station.

According to a sixth aspect of embodiments of the present disclosure, a device for transmitting a message is provided, which may include: a processor; and a memory configured to store instructions executable by the processor.

The processor is configured to: receive a request message sent by UE, the request message may include information relevant to a transmission rate; and process the request message.

According to a seventh aspect of embodiments of the present disclosure, a computer-readable storage medium is provided, on which computer instructions are stored. The instructions are executed by a processor to implement the method of the UE side.

According to an eighth aspect of embodiments of the present disclosure, a computer-readable storage medium is provided, on which computer instructions are stored. The instructions are executed by a processor to implement the method of the base station side.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of apparatuses and methods consistent with aspects related to the present disclosure.

Sometimes, UE in 5G NR systems may obtain an ultra-high transmission rate by configuring high-order MIMO, multicarrier aggregation, high-order modulation coding, large broadband or the like to meet requirements of users on a high rate. However, buffer configurations and read-write rates of some 5G terminals may not support the high rate of the 5G, which may cause the problem of buffer overflows of the 5G terminal due to a fact that the buffer configuration and read-write rate of the 5G terminal are mismatched with the high rate of the 5G. This problem causes frequent data retransmissions, thereby wasting system resources and affecting service qualities.

Figure 1:
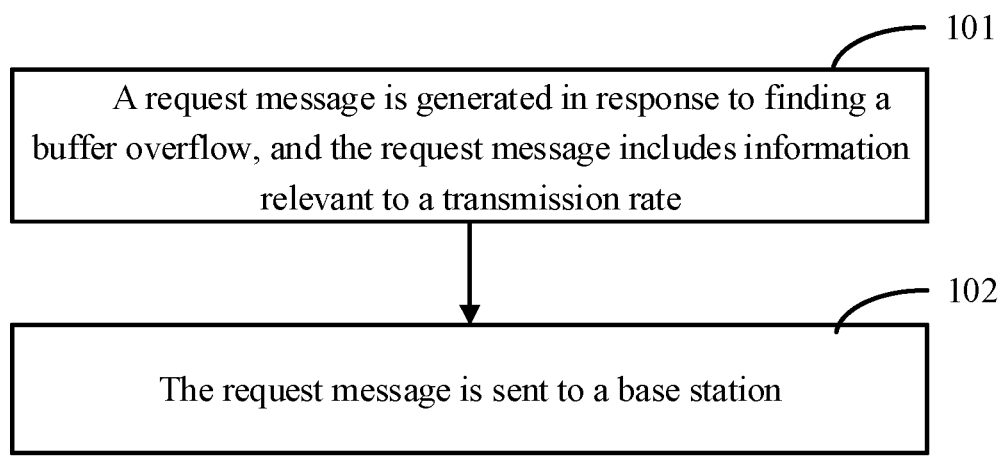
FIG. 1 is a flow chart showing a method for transmitting a message, according to an embodiment.

FIG. 1 is a flow chart showing a method for transmitting a message, according to an embodiment. The method for transmitting the message is applied to UE. The UE may be a mobile phone, a computer, a digital broadcast terminal, a messaging device, a gaming console, a tablet, a medical device, exercise equipment, a personal digital assistant and the like. As illustrated in FIG. 1, the method may include steps 101 to 102 as follows.

In the step 101, a request message is generated in response to finding a buffer overflow, and the request message includes information relevant to a transmission rate.

In the step 102, the request message is sent to a base station.

In the embodiment, in response to finding the buffer overflow and particularly the buffer overflow due to a fact that uplink and downlink transmission rates are mismatched, the request message may be sent, so as to request a reduction in the transmission rate. The problem of the buffer overflow is solved by reducing the transmission rate.

In the embodiment, in response to finding the buffer overflow, a message interactive process is increased, and the UE may send the request message. The embodiment provides the structure of the request message. The request message may include the information relevant to the transmission rate, so as to request the reduction in the transmission rate.

In an embodiment, the information relevant to the transmission rate includes at least one of: reporting information on a buffer overflow caused by a mismatch of the rate, a present transmission rate value, or an expected transmission rate value reached after reduction.

The information relevant to the transmission rate in the embodiment may include multiple types of information. For example, when the reporting information on the buffer overflow caused by the mismatch of the rate is included, the UE reports a present buffer overflow state to the base station. Upon the reception of the information, the base station knows that the UE requests a reduction in the transmission rate. The base station may send a response message representing consent. Upon the reception of the response message, the UE determines a transmission rate value reached after reduction by itself. Or, the base station sends a response message including an expected transmission rate value reached after reduction. The UE reduces the rate to the transmission rate value according to the indication of the base station. Or, the base station sends a response message representing a rejection, and the UE retains the present transmission rate unchanged.

Also for example, when the present transmission rate value is included, the UE reports a present transmission state to the base station. Upon the reception of the information, the base station knows that the UE has the buffer overflow caused by the mismatch of the rate and requests a reduction in the transmission rate. The base station may send a response message representing consent. Upon the reception of the response message, the UE determines a transmission rate value reached after reduction by itself. Or, the base station determines, with reference to the present transmission rate value, an expected transmission rate value reached after reduction, and adds the determined expected transmission rate value reached after reduction in a response message. The UE reduces the rate to the transmission rate value according to the indication of the base station. Or, the base station sends a response message representing a rejection, and the UE retains the present transmission rate unchanged.

Also for example, when the expected transmission rate value reached after reduction is included, the UE explicitly indicates that the transmission rate is expected to be reduced, and reports the expected transmission rate value reached after reduction to the base station. Upon the reception of the information, the base station knows that the UE requests a reduction in the transmission rate. The base station may send a response message representing consent. Upon the reception of the response message, the UE makes an adjustment according to the reported expected transmission rate value reached after reduction. Or, the base station determines, with reference to the reported expected transmission rate value reached after reduction, an expected transmission rate value reached after reduction, and adds the determined expected transmission rate value reached after reduction in a response message. The UE reduces the rate to the transmission rate value according to the indication of the base station. Or, the base station sends a response message representing a rejection, and the UE retains the present transmission rate unchanged.

The above multiple implementation manners may be combined freely, i.e., the request message includes one or more types of information relevant to the transmission rate.

In an embodiment, the request message may include RRC signaling.

The request message in the embodiment may be implemented through high-level signaling, such as the RRC signaling. The embodiment is equivalent to the improvement on the RRC signaling.

In an embodiment, the method may further include steps A1 to A2.

In the step A1, a response message sent by the base station is received. The response message includes feedback information relevant to the transmission rate, and the feedback information includes at least one of: information representing consent on reducing the transmission rate, information representing a rejection on reducing the transmission rate, an expected transmission rate value reached after reduction, or an expected configuration required to reduce to the transmission rate value.

In the step A2, corresponding processing is performed according to the response message.

In the embodiment, the UE may receive the response message sent by the base station to complete the next interactive process. The response message may be RRC signaling. The embodiment is equivalent to the improvement on the RRC signaling.

The response message may include one or more types of feedback information relevant to the transmission rate, for example, when the response message includes the information representing the consent on reducing the transmission rate, the UE determines, upon the reception of the response message, a transmission rate value reached after reduction by itself.

Also for example, when the response message includes the information representing the rejection on reducing the transmission rate, the UE retains the present transmission rate unchanged.

Also for example, when the response message includes the expected transmission rate value reached after reduction, the UE reduces the rate to the transmission rate value according to the indication of the base station.

Also for example, when the response message includes the expected configuration required to reduce to the transmission rate value, it is indicated that the UE previously reports the expected transmission rate value, and the UE may adjust the transmission rate to the transmission rate value according to the configuration.

The above multiple implementation manners may be combined freely according to actual demands, i.e., the request message includes one or more types of information relevant to the transmission rate.

In an embodiment, the method may further include steps B1 to B2.

In the step B1, a timer is started when the request message is sent to the base station.

In the step B2, a present transmission rate is retained if the response message sent by the base station is not received when the timer expires.

If the response message sent by the base station is received before the timer expires, corresponding processing is performed according to the indication of the base station.

In the embodiment, the UE may start the timer, so as to avoid unrestrictedly waiting for the response message and reduce the error processing. The case where the response message sent by the base station is not received when the timer expires may be attributed to that the network is delayed, or the base station does not send the response message. No matter which condition is, the present transmission rate may be retained unchanged. The UE may resend the request message, or resend the request message after a certain period of time.

The implementation process will be described below in detail with several embodiments.

Figure 2:
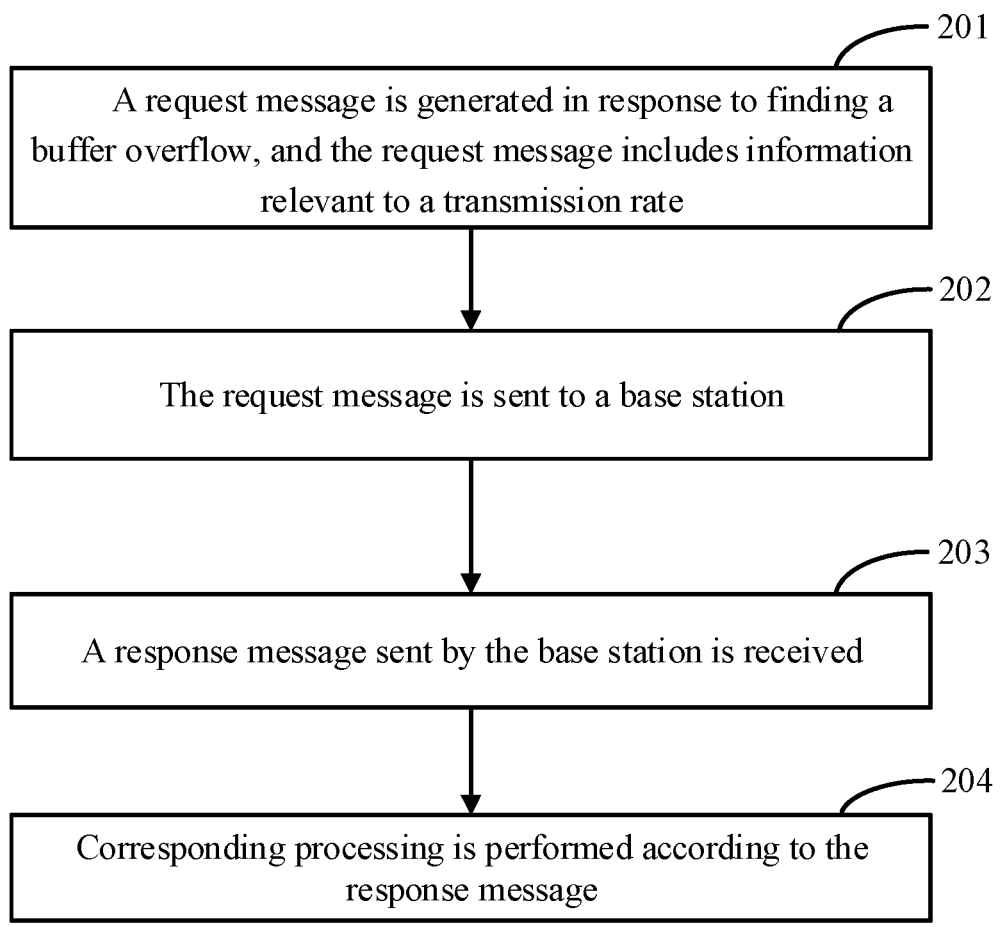
FIG. 2 is a flow chart showing a method for transmitting a message, according to an embodiment.

FIG. 2 is a flow chart showing a method for transmitting a message, according to an embodiment. The method for transmitting the message is applied to UE. The UE may be a mobile phone, a computer, a digital broadcast terminal, a messaging device, a gaming console, a tablet, a medical device, exercise equipment, a personal digital assistant, and the like. As illustrated in FIG. 2, the method may include steps 201 to 204 as follows.

In the step 201, a request message is generated in response to finding a buffer overflow, and the request message includes information relevant to a transmission rate.

In the step 202, the request message is sent to a base station.

In the step 203, a response message sent by the base station is received. The response message includes feedback information relevant to the transmission rate, and the feedback information includes at least one of: information representing consent on reducing the transmission rate, information representing a rejection on reducing the transmission rate, an expected transmission rate value reached after reduction, or an expected configuration required to reduce to the transmission rate value.

In the step 204, corresponding processing is performed according to the response message.

Figure 3:
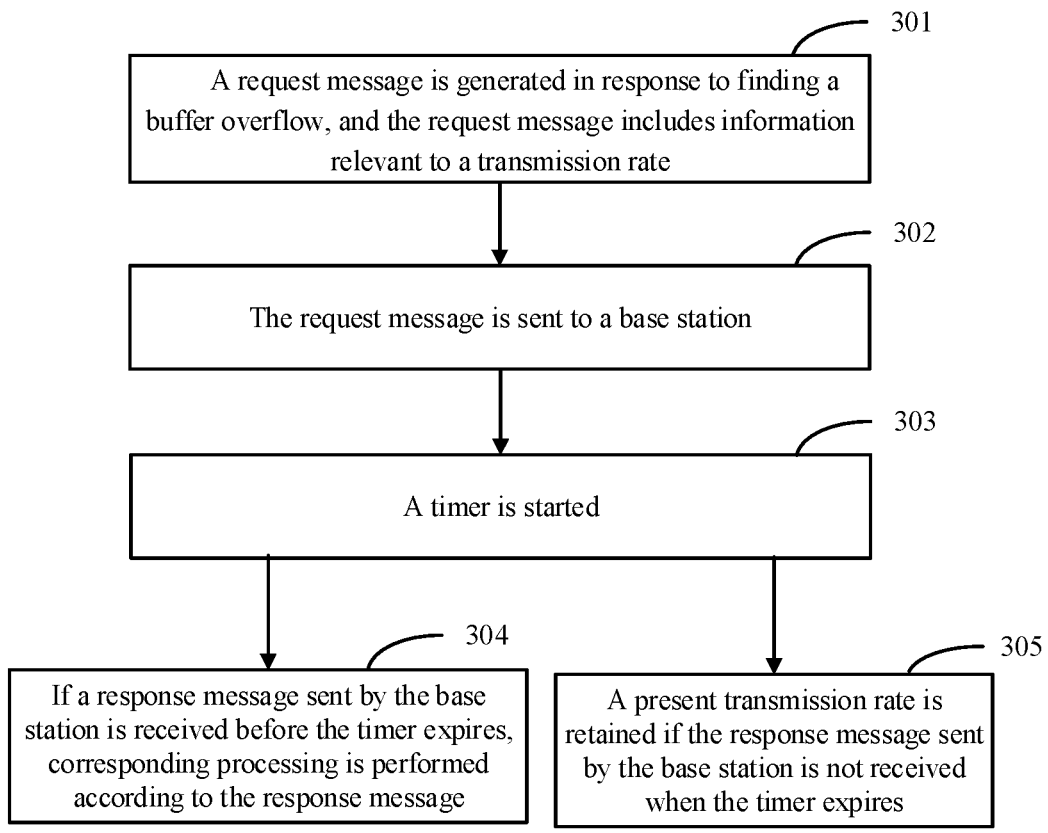
FIG. 3 is a flow chart showing a method for transmitting a message, according to an embodiment.

FIG. 3 is a flow chart showing a method for transmitting a message, according to an embodiment. The method for transmitting the message is applied to UE. The UE may be a mobile phone, a computer, a digital broadcast terminal, a messaging device, a gaming console, a tablet, a medical device, exercise equipment, a personal digital assistant, and the like. As illustrated in FIG. 3, the method may include steps 301 to 305 as follows.

In the step 301, a request message is generated in response to finding a buffer overflow, and the request message includes information relevant to a transmission rate.

In the step 302, the request message is sent to a base station.

In the step 303, a timer is started.

In the step 304, if a response message sent by the base station is received before the timer expires, corresponding processing is performed according to the response message. The response message includes feedback information relevant to the transmission rate, and the feedback information includes at least one of: information representing consent on reducing the transmission rate, information representing a rejection on reducing the transmission rate, an expected transmission rate value reached after reduction, or an expected configuration required to reduce to the transmission rate value.

In the step 305, a present transmission rate is retained if the response message sent by the base station is not received when the timer expires.

In the embodiment, if the response message is received before the timer expires, the timer stops timing. If the response message sent by the base station is not received when the timer expires, the present transmission rate is retained. If the response message is received after the timer expires, the response message is ignored.

The above describes the implementation process of the UE side.

Correspondingly, the base station side also makes improvements. Hereinafter, the implementation process of the base station side will be described below.

Figure 4:
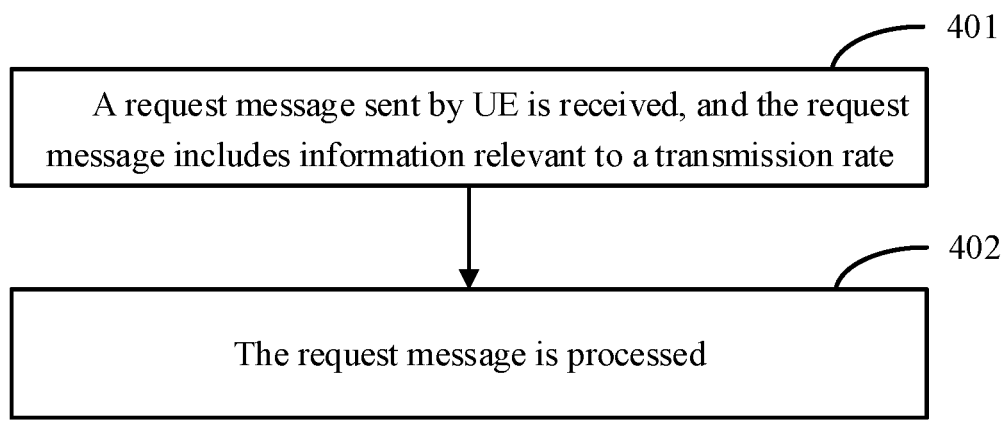
FIG. 4 is a flow chart showing a method for transmitting a message, according to an embodiment.

FIG. 4 is a flow chart showing a method for transmitting a message, according to an embodiment. The method for transmitting the message is applied to an access network device such as a base station and the like. As illustrated in FIG. 4, the method may include steps 401 to 402 as follows.

In the step 401, a request message sent by UE is received, and the request message includes information relevant to a transmission rate.

In the step 402, the request message is processed.

The embodiment may receive and analyze the request message, and know, according to the information relevant to the transmission rate included in the request message, that the UE requests a reduction in the transmission rate. The base station may perform corresponding processing according to the request of the UE.

In the embodiment, the base station may support and assist the UE to complete the interactive process in response to finding a buffer overflow.

In an embodiment, the information relevant to the transmission rate includes at least one of: reporting information on a buffer overflow caused by a mismatch of the rate, a present transmission rate value, or an expected transmission rate value reached after reduction.

The information relevant to the transmission rate in the embodiment may include multiple types of information. For example, when the reporting information on the buffer overflow caused by the mismatch of the rate is included, the UE reports a present buffer overflow state to the base station. Upon the reception of the information, the base station knows that the UE requests a reduction in the transmission rate. The base station may send a response message representing consent. Upon the reception of the response message, the UE determines a transmission rate value reached after reduction by itself. Or, the base station sends a response message including an expected transmission rate value reached after reduction. The UE reduces the rate to the transmission rate value according to the indication of the base station. Or, the base station sends a response message representing a rejection, and the UE retains the present transmission rate unchanged.

Also for example, when the present transmission rate value is included, the UE reports a present transmission state to the base station. Upon the reception of the information, the base station knows that the UE has the buffer overflow caused by the mismatch of the rate and requests a reduction in the transmission rate. The base station may send a response message representing consent. Upon the reception of the response message, the UE determines a transmission rate value reached after reduction by itself. Or, the base station determines, with reference to the present transmission rate value, an expected transmission rate value reached after reduction, and adds the determined expected transmission rate value reached after reduction in a response message. The UE reduces the rate to the transmission rate value according to the indication of the base station. Or, the base station sends a response message representing a rejection, and the UE retains the present transmission rate unchanged.

Also for example, when the expected transmission rate value reached after reduction is included, the UE explicitly indicates that the transmission rate is expected to be reduced, and reports the expected transmission rate value reached after reduction to the base station. Upon the reception of the information, the base station knows that the UE requests a reduction in the transmission rate. The base station may send a response message representing consent. Upon the reception of the response message, the UE makes an adjustment according to the reported expected transmission rate value reached after reduction. Or, the base station determines, with reference to the reported expected transmission rate value reached after reduction, an expected transmission rate value reached after reduction, and adds the determined expected transmission rate value reached after reduction in a response message. The UE reduces the rate to the transmission rate value according to the indication of the base station. Or, the base station sends a response message representing a rejection, and the UE retains the present transmission rate unchanged.

The above multiple implementation manners may be combined freely, i.e., the request message includes one or more types of information relevant to the transmission rate.

In an embodiment, the request message may include RRC signaling.

The request message in the embodiment may be implemented through high-level signaling, such as the RRC signaling. The embodiment is equivalent to the improvement on the RRC signaling.

In an embodiment, the method may further include step C.

In the step C, a response message is sent to the UE. The response message includes feedback information relevant to the transmission rate, and the feedback information includes at least one of: information representing consent on reducing the transmission rate, information representing a rejection on reducing the transmission rate, an expected transmission rate value reached after reduction, or an expected configuration required to reduce to the transmission rate value.

In the embodiment, the base station may send the response message to complete the next interactive process. The response message may be RRC signaling. The embodiment is equivalent to the improvement on the RRC signaling.

The response message may include one or more types of feedback information relevant to the transmission rate, for example, when the response message includes the information representing the consent on reducing the transmission rate, the UE determines, upon the reception of the response message, a transmission rate value reached after reduction by itself.

Also for example, when the response message includes the information representing the rejection on reducing the transmission rate, the UE retains the present transmission rate unchanged.

Also for example, when the response message includes the expected transmission rate value reached after reduction, the UE reduces the rate to the transmission rate value according to the indication of the base station.

Also for example, when the response message includes the expected configuration required to reduce to the transmission rate value, it is indicated that the UE previously reports the expected transmission rate value, and the UE may adjust the transmission rate to the transmission rate value according to the configuration.

The above multiple implementation manners may be combined freely according to actual demands, i.e., the request message includes one or more types of information relevant to the transmission rate.

In an embodiment, the method may further include step D.

In the step D, a response message is rejected to be sent when it is determined that the transmission rate is rejected to be reduced.

In the embodiment, the base station may not send the response message when determining to reject to reduce the transmission rate, so as to save network resources. The UE starts a timer when sending the request message to the base station. The present transmission rate is retained if the response message sent by the base station is not received when the timer expires. Therefore, the behavior of not sending the response message is also an indication to the UE, i.e., it is indicated that the UE retains the present transmission rate, and rejects to reduce the transmission rate.

The implementation process will be described below in detail with the embodiment.

Figure 5:
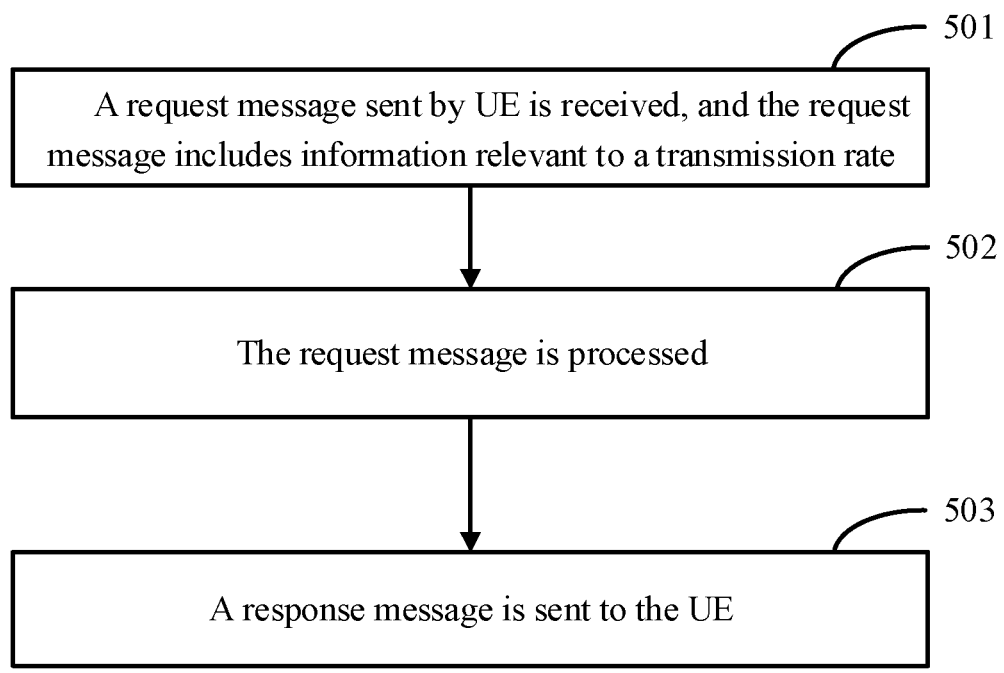
FIG. 5 is a flow chart showing a method for transmitting a message, according to an embodiment.

FIG. 5 is a flow chart showing a method for transmitting a message, according to an embodiment. The method for transmitting the message is applied to an access network device such as a base station and the like. As illustrated in FIG. 5, the method may include steps 501 to 503 as follows.

In the step 501, a request message sent by UE is received, and the request message includes information relevant to a transmission rate.

In the step 502, the request message is processed.

In the step 503, a response message is sent to the UE. The response message includes feedback information relevant to the transmission rate, and the feedback information includes at least one of: information representing consent on reducing the transmission rate, information representing a rejection on reducing the transmission rate, an expected transmission rate value reached after reduction, or an expected configuration required to reduce to the transmission rate value.

The implementation process will be described in combination with the UE side and the base station side.

Figure 6:
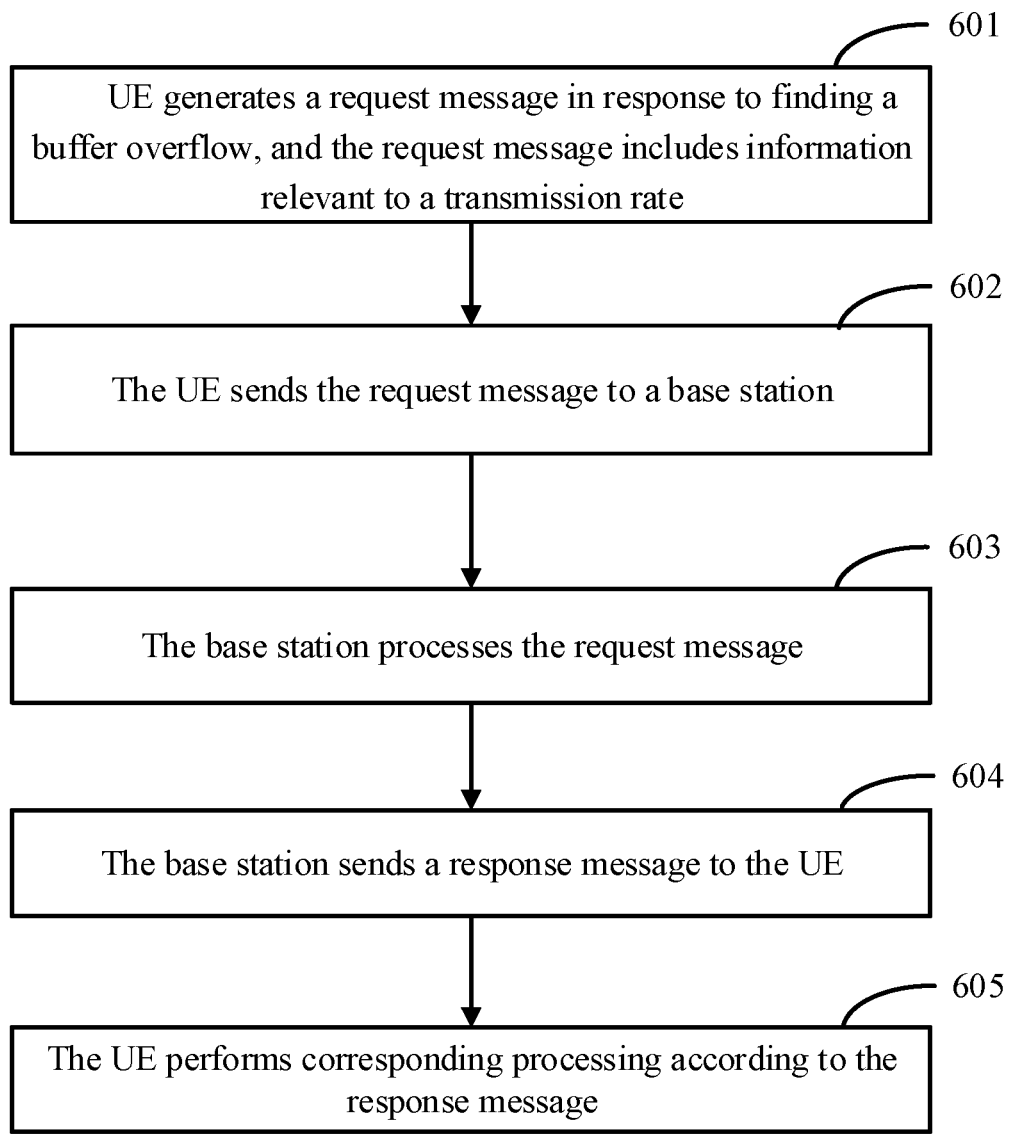
FIG. 6 is a flow chart showing a method for transmitting a message, according to an embodiment.

FIG. 6 is a flow chart showing a method for transmitting a message, according to an embodiment. As illustrated in FIG. 6, the method may include steps 601 to 605 as follows.

In the step 601, UE generates a request message in response to finding a buffer overflow, and the request message includes information relevant to a transmission rate.

In the step 602, the UE sends the request message to a base station.

In the step 603, the base station processes the request message.

In the step 604, the base station sends a response message to the UE. The response message includes feedback information relevant to the transmission rate, and the feedback information includes at least one of: information representing consent on reducing the transmission rate, information representing a rejection on reducing the transmission rate, an expected transmission rate value reached after reduction, or an expected configuration required to reduce to the transmission rate value.

In the step 605, the UE performs corresponding processing according to the response message.

The above embodiments may be combined freely according to actual demands.

The device embodiments of the present disclosure are set forth hereinafter, and may be configured to execute the method embodiments of the present disclosure.

Figure 7:
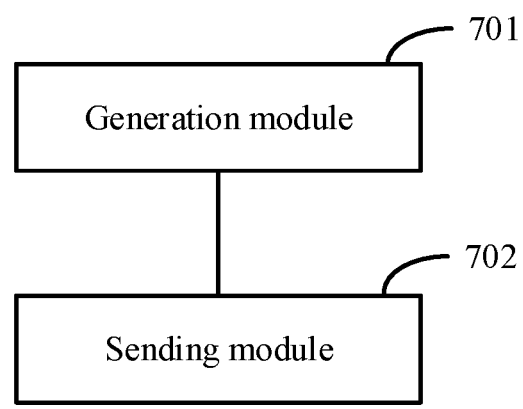
FIG. 7 is a block diagram of a device for transmitting a message, according to an embodiment.

FIG. 7 is a block diagram of a device for transmitting a message, according to an embodiment. The device may be implemented through software, hardware or a combination thereof to form a part or all of the electronic device. The device is applied to a UE side. Referring to FIG. 7, the device for transmitting the message may include a generation module 701 and a sending module 702.

The generation module 701 is configured to generate a request message in response to finding a buffer overflow, and the request message includes information relevant to a transmission rate.

The sending module 702 is configured to send the request message to a base station.

In an embodiment, the information relevant to the transmission rate includes at least one of: reporting information on a buffer overflow caused by a mismatch of the rate, a present transmission rate value, or an expected transmission rate value reached after reduction.

In an embodiment, the request message may include RRC signaling.

Figure 8:
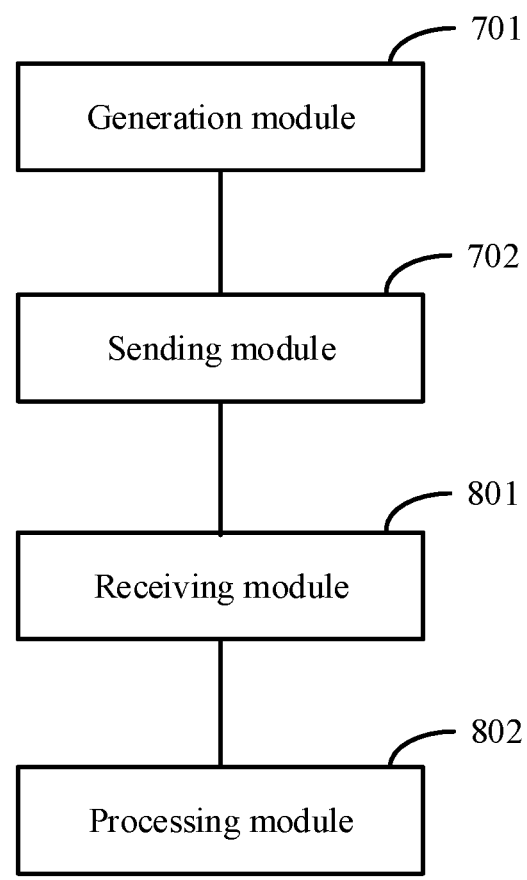
FIG. 8 is a block diagram of a device for transmitting a message, according to an embodiment.

In an embodiment, as illustrated in FIG. 8, the device may further include a receiving module 801 and a processing module 802.

The receiving module 801 is configured to receive a response message sent by the base station. The response message includes feedback information relevant to the transmission rate, and the feedback information includes at least one of: information representing consent on reducing the transmission rate, information representing a rejection on reducing the transmission rate, an expected transmission rate value reached after reduction, or an expected configuration required to reduce to the transmission rate value.

The processing module 802 is configured to perform corresponding processing according to the response message.

Figure 9:
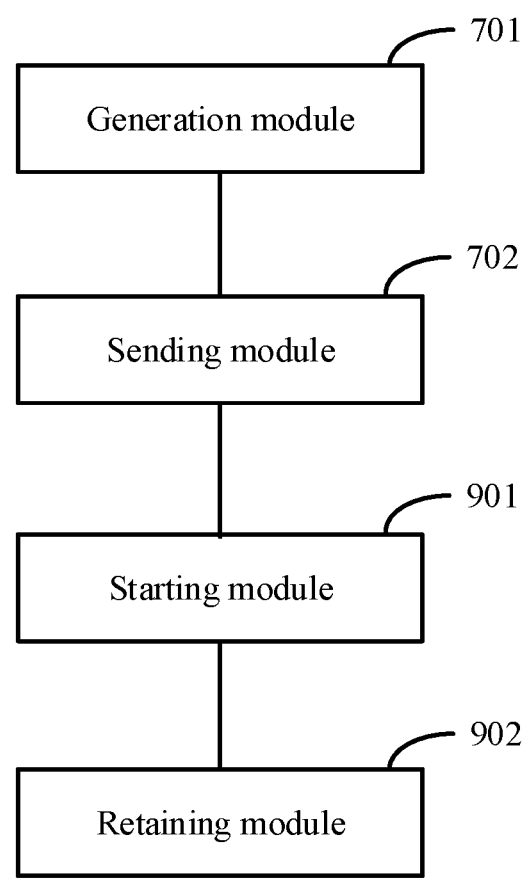
FIG. 9 is a block diagram of a device for transmitting a message, according to an embodiment.

In an embodiment, as illustrated in FIG. 9, the device may further include a starting module 901 and a retaining module 902.

The starting module 901 is configured to start a timer when sending the request message to the base station.

The retaining module 902 is configured to retain a present transmission rate when a response message sent by the base station is not received in response to the timer expiring.

The device embodiments of the present disclosure are set forth hereinafter, and may be configured to execute the method embodiments of the present disclosure.

Figure 10:
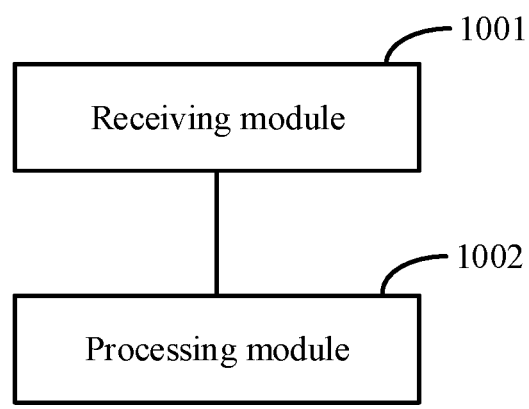
FIG. 10 is a block diagram of a device for transmitting a message, according to an embodiment.

FIG. 10 is a block diagram of a device for transmitting a message, according to an embodiment. The device may be implemented through software, hardware or a combination thereof to form a part or all of the electronic device. The device is applied to a base station side. Referring to FIG. 10, the device for transmitting the message may include a receiving module 1001 and a processing module 1002.

The receiving module 1001 is configured to receive a request message sent by UE, and the request message includes information relevant to a transmission rate.

The processing module 1002 is configured to process the request message.

In an embodiment, the information relevant to the transmission rate includes at least one of: reporting information on a buffer overflow caused by a mismatch of the rate, a present transmission rate value, or an expected transmission rate value reached after reduction.

In an embodiment, the request message may include RRC signaling.

Figure 11:
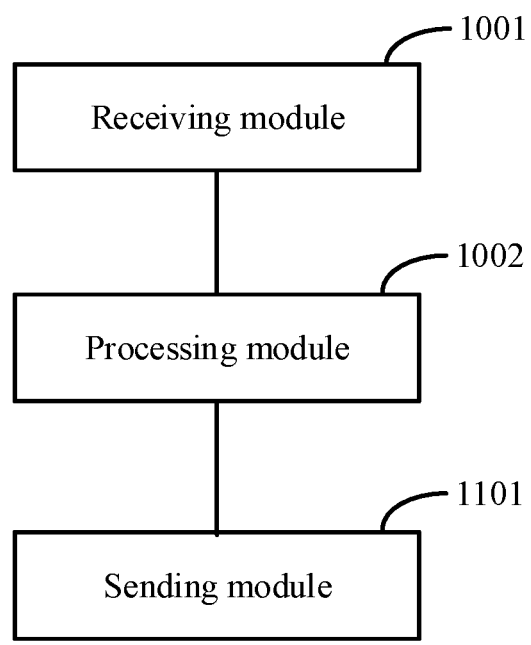
FIG. 11 is a block diagram of a device for transmitting a message, according to an embodiment.

In an embodiment, as illustrated in FIG. 11, the device may further include a sending module 1101.

The sending module 1101 is configured to send a response message to the UE. The response message includes feedback information relevant to the transmission rate, and the feedback information includes at least one of: information representing consent on reducing the transmission rate, information representing a rejection on reducing the transmission rate, an expected transmission rate value reached after reduction, or an expected configuration required to reduce to the transmission rate value.

Figure 12:
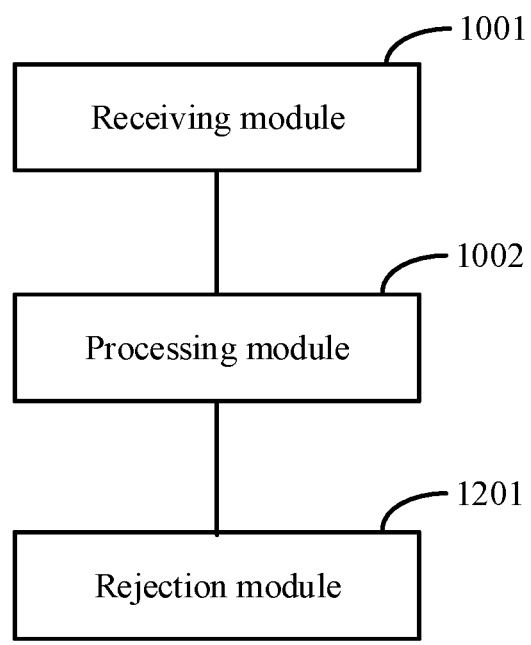
FIG. 12 is a block diagram of a device for transmitting a message, according to an embodiment.

In an embodiment, as illustrated in FIG. 12, the device may further include a rejection module 1201.

The rejection module 1201 is configured to reject to send a response message when determining that the transmission rate is rejected to be reduced.

For the device in the above embodiments, the specific manner for the operation executed by each module has been described in detail in the embodiments related to the method, and is not repeated herein.

Figure 13:
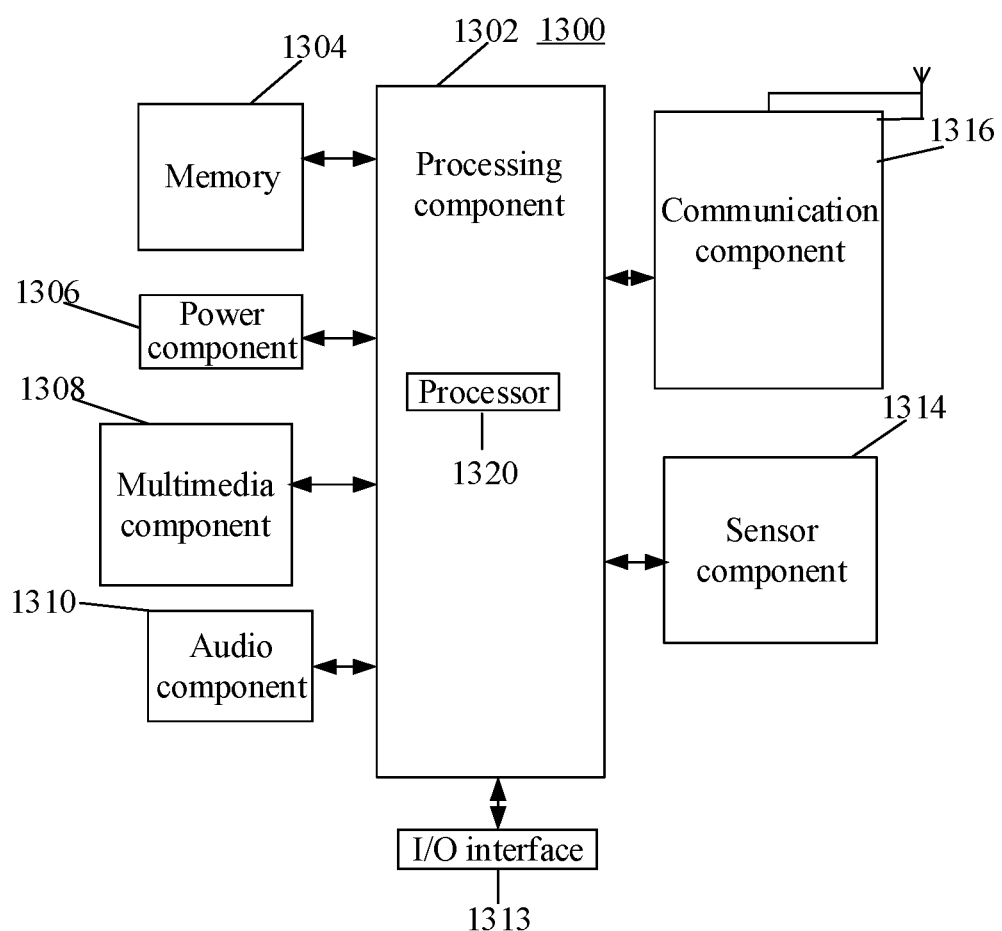
FIG. 13 is a block diagram of a device suitable for transmitting a message, according to an embodiment.

FIG. 13 is a block diagram of a device suitable for transmitting a message, according to an embodiment. For example, the device 1300 may be a mobile phone, a computer, a digital broadcast terminal, a messaging device, a gaming console, a tablet, a medical device, exercise equipment, a personal digital assistant, and the like.

The device 1300 may include one or more of the following components: a processing component 1302, a memory 1304, a power component 1306, a multimedia component 1308, an audio component 1310, an input/output (I/O) interface 1313, a sensor component 1314, or a communication component 1316.

The processing component 1302 typically controls overall operations of the device 1300, such as the operations associated with display, telephone calls, data communications, camera operations, and recording operations. The processing component 1302 may include one or more processors 1320 to execute instructions to perform all or part of the steps in the abovementioned methods. Moreover, the processing component 1302 may include one or more modules which facilitate interaction between the processing component 1302 and other components. For instance, the processing component 1302 may include a multimedia module to facilitate interaction between the multimedia component 1308 and the processing component 1302.

The memory 1304 is configured to store various types of data to support the operation of the device 1300. Examples of such data include instructions for any applications or methods operated on the device 1300, contact data, phonebook data, messages, pictures, video, etc. The memory 1304 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 1306 provides power for various components of the device 1300. The power component 1306 may include a power management system, one or more power supplies, and other components associated with generation, management and distribution of power for the device 1300.

The multimedia component 1308 includes a screen providing an output interface between the device 1300 and a user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a period of time and a pressure associated with the touch or swipe action. In some embodiments, the multimedia component 1308 includes a front camera and/or a rear camera. The front camera and/or the rear camera may receive external multimedia data when the device 1300 is in an operation mode, such as a photographing mode or a video mode. Each of the front camera and the rear camera may be a fixed optical lens system or have focusing and optical zooming capabilities.

The audio component 1310 is configured to output and/or input an audio signal. For example, the audio component 1310 includes a microphone (MIC), and the MIC is configured to receive an external audio signal when the device 1300 is in an operation mode, such as a call mode, a recording mode and a voice recognition mode. The received audio signal may further be stored in the memory 1304 or sent via the communication component 1316. In some embodiments, the audio component 1310 further includes a speaker configured to output the audio signal.

The I/O interface 1313 provides an interface between the processing component 1302 and peripheral interface modules, such as a keyboard, a click wheel, buttons and the like. The buttons may include, but are not limited to, a home button, a volume button, a starting button and a locking button.

The sensor component 1314 includes one or more sensors configured to provide status assessments in various aspects for the device 1300. For instance, the sensor component 1314 may detect an on/off status of the device 1300 and relative positioning of components, such as a display and small keyboard of the device 1300, and the sensor component 1314 may further detect a change in a position of the device 1300 or a component of the device 1300, presence or absence of contact between the user and the device 1300, orientation or acceleration/deceleration of the device 1300 and a change in temperature of the device 1300. The sensor component 1314 may include a proximity sensor configured to detect presence of an object nearby without any physical contact. The sensor component 1314 may also include a light sensor, such as a complementary metal oxide semiconductor (CMOS) or charge coupled device (CCD) image sensor, configured for use in an imaging application. In some embodiments, the sensor component 1314 may also include an acceleration sensor, a gyroscope sensor, a magnetic sensor, a pressure sensor or a temperature sensor.

The communication component 1316 is configured to facilitate wired or wireless communication between the device 1300 and other devices. The device 1300 may access a communication-standard-based wireless network, such as a wireless fidelity (WiFi) network, a 2nd-generation (2G) or 3rd-generation (3G) network or a combination thereof. In an embodiment, the communication component 1316 receives a broadcast signal or broadcast associated information from an external broadcast management system via a broadcast channel. In an embodiment, the communication component 1316 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In embodiments, the device 1300 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, for performing the abovementioned methods.

In an embodiment, there is also provided a non-transitory computer-readable storage medium including instructions, such as included in the memory 1304, executable by the processing component 1320 of the device 1300 for performing the above method. For example, the non-transitory computer-readable storage medium may be a read only memory (ROM), a random access memory (RAM), a compact disc read-only memory (CD-ROM), a magnetic tape, a floppy disc, an optical data storage device, and the like.

In an embodiment, a device for transmitting a message is provided, which may include: a processor; and a memory, configured to store instructions executable by the processor.

The processor is configured to:
generate a request message in response to finding a buffer overflow, the request message may include information relevant to a transmission rate; and
send the request message to a base station.
The processor may further be configured as follows:
the information relevant to the transmission rate may include at least one of: reporting information on a buffer overflow caused by a mismatch of the rate, a present transmission rate value, or an expected transmission rate value reached after reduction.
The processor may further be configured as follows:
The request message may include RRC signaling.
The processor may further be configured as follows:
the method may further include the following operations:
a response message sent by the base station is received; the response message may include feedback information relevant to the transmission rate, and the feedback information may include at least one of: information representing consent on reducing the transmission rate, information representing a rejection on reducing the transmission rate, an expected transmission rate value reached after reduction, or an expected configuration required to reduce to the transmission rate value; corresponding processing is performed according to the response message.

The processor may further be configured as follows:
the method may further include the following operations: a timer is started when the request message is sent to the base station; a present transmission rate is retained if a response message sent by the base station is not received when the timer expires.

A computer-readable storage medium is provided; when instructions in the storage medium are executed by a processor of a device, to cause the device to execute the above method for transmitting the message. The method may include the following operations.

A request message is generated in response to finding a buffer overflow, and the request message includes information relevant to a transmission rate; and the request message is sent to a base station.

The instructions in the storage medium may further include:
the information relevant to the transmission rate may include at least one of: reporting information on a buffer overflow caused by a mismatch of the rate, a present transmission rate value, or an expected transmission rate value reached after reduction.

The instructions in the storage medium may further include:
the request message may include RRC signaling.

The instructions in the storage medium may further include:
the method may further include the following operations: a response message sent by the base station is received; the response message may include feedback information relevant to the transmission rate, and the feedback information may include at least one of: information representing consent on reducing the transmission rate, information representing a rejection on reducing the transmission rate, an expected transmission rate value reached after reduction, or an expected configuration required to reduce to the transmission rate value; corresponding processing is performed according to the response message.

The instructions in the storage medium may further include:
the method may further include the following operations: a timer is started when the request message is sent to the base station; a present transmission rate is retained if a response message sent by the base station is not received when the timer expires.

Figure 14:
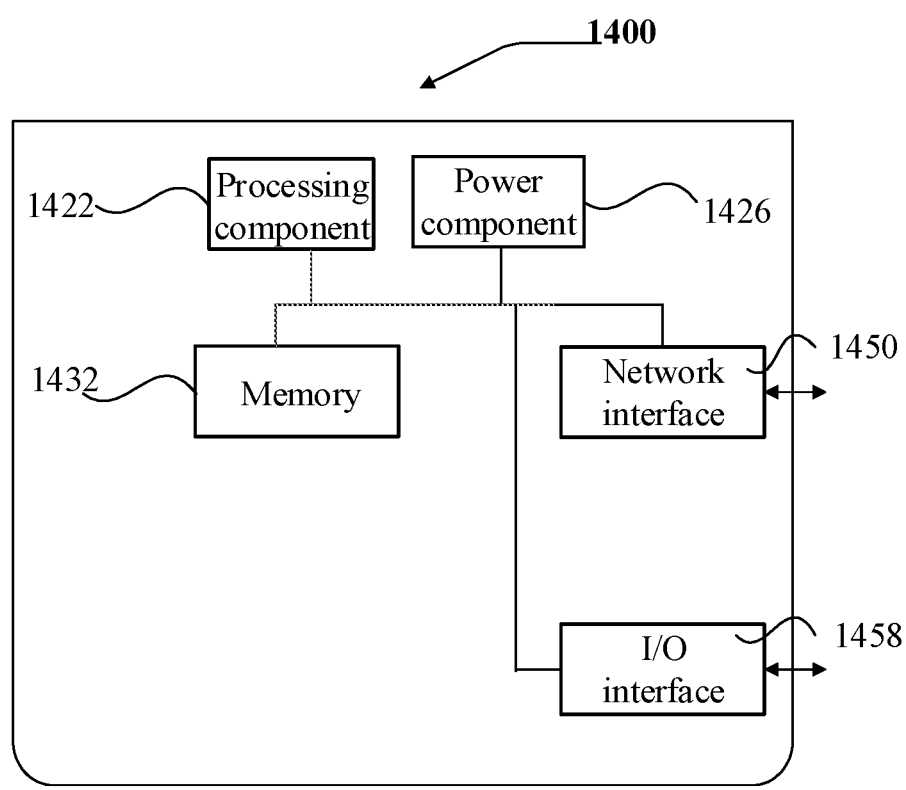
FIG. 14 is a block diagram of a device suitable for transmitting a message, according to an embodiment.

FIG. 14 is a block diagram of a device 1400 for synchronizing data, according to an embodiment. For example, the device 1400 may be provided as a computer. Referring to FIG. 14, the device 1400 includes a processing component 1422, and further includes one or more processors, and a memory resource represented by a memory 1432 and configured to store instructions that may be executed by the processing component 1422, such as an application program. The application program stored in the memory 1432 may include one or more modules, with each module corresponding to one group of instructions. In addition, the processing component 1422 is configured to execute the instructions to synchronize data according to the above method.

The device 1400 may further include a power component 1426, configured to execute power management of the device 1400, a wired or wireless network interface 1450 configured to connect the device 1400 to the network, and an input/output (I/O) interface 1458. The device 1400 may be operated based on an operating system stored in the memory 1432, for example, Windows Server™, Mac OS X™, Unix™, Linux™, FreeBSD™ or the like.

In an embodiment, a device for transmitting a message is provided, which may include: a processor; and a memory, configured to store instructions executable by the processor.

The processor is configured to:
receive a request message sent by UE, the request message may include information relevant to a transmission rate; and
process the request message.

The processor may further be configured as follows:
the information relevant to the transmission rate may include at least one of: reporting information on a buffer overflow caused by a mismatch of the rate, a present transmission rate value, or an expected transmission rate value reached after reduction.

The processor may further be configured as follows:
the request message may include RRC signaling.

The processor may further be configured as follows:
the method may further include the following operations: a response message is sent to the UE; the response message may include feedback information relevant to the transmission rate, and the feedback information may include at least one of: information representing consent on reducing the transmission rate, information representing a rejection on reducing the transmission rate, an expected transmission rate value reached after reduction, or an expected configuration required to reduce to the transmission rate value.

The processor may further be configured as follows:
the method may further include the following operations: a response message is rejected to be sent when it is determined that the transmission rate is rejected to be reduced.

A computer-readable storage medium is provided; and when instructions in the storage medium are executed by a processor of a device, to cause the device to execute the above method for transmitting the message. The method may include the following operations.

A request message sent by UE is received, the request message may include information relevant to a transmission rate; the request message is processed.

The instructions in the storage medium may further include:
the information relevant to the transmission rate may include at least one of: reporting information on a buffer overflow caused by a mismatch of the rate, a present transmission rate value, or an expected transmission rate value reached after reduction.

The instructions in the storage medium may further include:
the request message may include RRC signaling.

The instructions in the storage medium may further include:
the method may further include the following operations: a response message is sent to the UE; the response message may include feedback information relevant to the transmission rate, and the feedback information may include at least one of: information representing consent on reducing the transmission rate, information representing a rejection on reducing the transmission rate, an expected transmission rate value reached after reduction, or an expected configuration required to reduce to the transmission rate value.

The instructions in the storage medium may further include:
the method may further include the following operation:
a response message is rejected to be sent when it is determined that the transmission rate is rejected to be reduced.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only.

It will be appreciated that the present disclosure is not limited to the exact construction that has been described above and illustrated in the accompanying drawings, and that various modifications and changes may be made without departing from the scope thereof

What is claimed is:

1. A method for transmitting a message, applied to a user equipment (UE) side, and comprising:
generating a request message in response to finding a buffer overflow, wherein the request message comprises information relevant to a transmission rate of the UE, and the information relevant to the transmission rate of the UE comprises a transmission rate value of the UE reached after reduction that is expected by the UE;
sending the request message to a base station;
receiving a response message sent by the base station, wherein the response message comprises feedback information relevant to the transmission rate of the UE, and the feedback information comprises a transmission rate value of the UE reached after reduction that is expected by the base station and is determined based on the transmission rate value of the UE reached after the reduction that is expected by the UE; and
performing corresponding processing according to the response message, wherein performing the corresponding processing according to the response message comprises:
reducing a present transmission rate of the UE according to the response message.

2. The method of claim 1, wherein the information relevant to the transmission rate of the UE further comprises at least one of: reporting information on a buffer overflow caused by a mismatch of the rate, or the present transmission rate of the UE.

3. The method of claim 1, wherein the request message comprises radio resource control (RRC) signaling.

4. The method of claim 1, further comprising:
starting a timer in response to sending the request message to the base station; and
retaining the present transmission rate of the UE when the response message sent by the base station is not received in response to the timer expiring.

5. A method for transmitting a message, applied to a base station side, and comprising:
receiving a request message sent by user equipment (UE), wherein the request message comprises information relevant to a transmission rate of the UE, and the information relevant to the transmission rate of the UE comprises a transmission rate value of the UE reached after reduction that is expected by the UE;
processing the request message; and
sending a response message to the UE, wherein the response message comprises feedback information relevant to the transmission rate of the UE, and the feedback information comprises a transmission rate value of the UE reached after reduction that is expected by the base station and is determined based on the transmission rate value of the UE reached after the reduction that is expected by the UE, wherein the response message enables the UE to reduce or retain a present transmission rate of the UE.

6. The method of claim 5, wherein the information relevant to the transmission rate of the UE further comprises at least one of: reporting information on a buffer overflow caused by a mismatch of the rate, or the present transmission rate of the UE.

7. The method of claim 5, wherein the request message comprises radio resource control (RRC) signaling.

8. The method of claim 5, further comprising:
rejecting to send the response message in response to determining that the transmission rate of the UE is rejected to be reduced.

9. A device for transmitting a message, applied to a user equipment (UE) side, comprising:
a processor; and
a memory configured to store instructions executable by the processor;
wherein the processor is configured to:
generate a request message in response to finding a buffer overflow, wherein the request message comprises information relevant to a transmission rate of the UE, and the information relevant to the transmission rate of the UE comprises a transmission rate value of the UE reached after reduction that is expected by the UE;
send the request message to a base station;
receive a response message sent by the base station, wherein the response message comprises feedback information relevant to the transmission rate of the UE, and the feedback information comprises a transmission rate value of the UE reached after reduction that is expected by the base station and is determined based on the transmission rate value of the UE reached after the reduction that is expected by the UE; and
perform corresponding processing according to the response message, wherein the processor is specifically configured to:

reduce a present transmission rate of the UE according to the response message.

10. The device of claim 9, wherein the information relevant to the transmission rate of the UE further comprises at least one of: reporting information on a buffer overflow caused by a mismatch of the rate, or the present transmission rate of the UE.

11. The device of claim 9, wherein the request message comprises radio resource control (RRC) signaling.

12. The device of claim 9, wherein the processor is further configured to:
- start a timer in response to sending the request message to the base station; and
- retain the present transmission rate of the UE when the response message sent by the base station is not received in response to the timer expiring.

* * * * *